United States Patent [19]

Huvard et al.

[11] Patent Number: 5,587,096
[45] Date of Patent: Dec. 24, 1996

[54] DE-LABELLING FOR REMOVING APPARATUS LABELS ADHERED TO A DISKETTE UTILIZING OPPOSED HEATERS

[76] Inventors: Gary S. Huvard, 7819 Tochester Dr., Chesterfield, Va. 23832; Alfred D. Lobo, 2655 Euclid Heights Blvd., Cleveland Heights, Ohio 44106

[21] Appl. No.: 361,060

[22] Filed: Dec. 21, 1994

Related U.S. Application Data

[62] Division of Ser. No. 39,895, Mar. 30, 1993, Pat. No. 5,378,300.

[51] Int. Cl.$^6$ .............................. B32B 35/00; H05B 1/00
[52] U.S. Cl. .......................... 219/521; 219/492; 219/506; 219/388; 219/201; 219/243; 392/418; 392/432; 156/344; 156/584; 156/272.2; 156/DIG. 51
[58] Field of Search .................................. 219/243, 492, 219/506, 521, 385, 200, 201, 221, 388, 486; 392/418, 419, 432, 440, 417; 156/272.2, DIG. 51, 344, 584; 99/389, 391, 392

[56] References Cited

U.S. PATENT DOCUMENTS

| | | | |
|---|---|---|---|
| 1,516,054 | 11/1924 | Mottlau | 99/392 |
| 2,562,146 | 7/1951 | Hultkrans | 392/418 |
| 2,564,677 | 8/1951 | Davis | 99/391 |
| 3,420,982 | 1/1969 | Hager, Jr. | 219/388 |
| 4,024,009 | 5/1977 | Amsden et al. | 156/272.2 |
| 4,033,804 | 7/1977 | Baldyga | 156/344 |
| 4,170,932 | 10/1979 | Lalancette | 99/326 |
| 4,346,651 | 8/1982 | Schickedanz | 99/392 |
| 4,647,758 | 3/1987 | Kelian | 219/385 |
| 4,824,496 | 4/1989 | Seifert et al. | 156/64 |
| 5,072,665 | 12/1991 | Lababia Del Fresno | 99/391 |
| 5,181,455 | 1/1993 | Masel et al. | 99/391 |
| 5,378,300 | 1/1995 | Huvard et al. | 156/344 |

FOREIGN PATENT DOCUMENTS 562932  5/1957  Italy ........................ 392/418

*Primary Examiner*—John A. Jeffery
*Attorney, Agent, or Firm*—Alfred D. Lobo

[57] ABSTRACT

A de-labeler made with easily available structural elements which cooperate to remove a normally non-removable label from a labeled surface of a casing for magnetic media, film, and the like, without using a solvent of any kind. The labeled surface is heated just enough to cause desired viscous deformation of a thin layer of adhesive, or a sufficient decrease of viscosity to loosen the label and enable it to be manually removed, preferably by adhesive failure of the thin adhesive layer. A typical pressure sensitive adhesive ("PSA") is heated to a temperature in the range from 32° C.–65° C., for an interval of time in the range from 5 to 30 seconds, in inverse relationship to the temperature at which the labeled surface is heated. The label is manually peeled away from the surface with a force in the range from 0.5 lb-force to about 10 lb-force, without distorting or otherwise damaging either the casing or the magnetic recording medium encased therein. A delabeler has a housing with a receptacle adapted to hold the diskette between opposed first and second heater boxes, one larger than the other, mounted in spaced-apart relationship, preferably so as to heat only the labeled area. Heating is controlled with a timer and a starting switch.

10 Claims, 12 Drawing Sheets

DE-LABELLING FOR REMOVING APPARATUS LABELS ADHERED TO A DISKETTE UTILIZING OPPOSED HEATERS

This is a division of patent application Ser. No. 039,895, filed on 30 Mar. 1993, now U.S. Pat. No. 5,378,300.

BACKGROUND OF THE INVENTION

Electronic information, recorded and magnetically stored so as to be processed as software by a central processing unit "CPU" of a computer, must be identified for visual recognition, to allow a human to know the relevance of that information. Such identification by indicia relating to the information, is typically a legend imprinted on a label adhesively secured to a particular portion of the exterior surface of a diskette's substantially rigid rectangular protective cover, referred to as a "casing". The casing is formed by sealing a pair of opposed thin-walled front and rear sidewalls in spaced-apart relationship, along their peripheral edges, the spacing being sufficient to accommodate an electronic data storage disk and a pair of opposed foamed synthetic resinous pads on either side thereof.

The diskette is inserted in a slot in the CPU to be "read". The diskette may also be used in a disk drive means operatively connected with the CPU, or in some other processing unit of a computer. The casing non-removably encases the storage disk, specifically a flexible "floppy" disk of coated synthetic resinous material, which disk is rotatably disposed for rotation about a central transverse or z-axis of the diskette, if the diskette is said to be planarly disposed in the x-y plane, the x-axis being the longitudinal axis, and, the y-axis the vertical.

The lower portion of the casing is referred to as the "label portion" upon which the label is to be adhesively secured; and, the upper portion is referred to as the "slidable gate portion". Each portion is inwardly off-set from the remaining surface portion, referred to as the "uncovered portion" of the exterior surface of the casing. The term "uncovered portion" is used because the "label portion" is to be covered by a label, and the "slidable gate portion" is partially covered by a slidable gate, which is spring-loaded and reciprocably disposed along the upper edge of that portion. The label portion extends over about 60% of the area on one side, referred to herein as the "front label portion" of the diskette, and over about 15% of the area of the other side, referred to as the "rear label portion". The front sidewall of the diskette is said to lie in the vertical x-y plane.

As will presently be apparent, details of the construction of a "standard" 9 cm or three and one-half inches (3.5") substantially square diskette (it is slightly longer or higher along the y-axis than it is wide along the x-axis) are relevant because of the extent to which the construction permits protection of the storage disk from a high temperature heat source, in a heating zone, in which a labeled diskette is to be placed.

This invention is specifically related to a method for removing a conventional label applied to the label portion of the casing with an adhesive, most typically a pressure-sensitive adhesive, and to a device in which the diskette is directly heated, preferably only across its label portion, before the label is manually removed, hence referred to as a "de-labeling means" or "de-labeler".

Much effort has been devoted to the problem of positioning and adhesively securing a single label on a "standard" 9 cm diskette accurately. Though apparatus is now available which can execute such a labeling task satisfactorily, the cost of such labeling of diskettes is prohibitive. Such apparatus is used by producers of software who record and label thousands of sets of diskettes, each set containing from one to a dozen diskettes, or more.

An analogous problem arises with respect to labels secured with a pressure sensitive adhesive ("PSA") similar to those used for labels on diskettes, in those instances where the original labels on casings for 44-Meg and 88-Meg removable cartridges, and casings for other media such as film, cards of various types, cigars, chocolate candies and myriad "notions" sold over the counters of stores. The common feature shared by such casings is that they are geometrical bodies, symmetrical about two axes, and present at least one relatively large surface, front or rear, to which a label is non-removably adhered.

It will be appreciated that with diskettes and removable cartridges, the casing is typically a synthetic resinous material which is itself a poor heat conductor, and facilitates the task of removing the label with a storage medium encased within. In other instances, for example with chocolates, the casing is empty when the label is to be removed.

New, that is "blank" diskettes, whether formatted or not, are sold by most manufacturers without being labeled. Blank diskettes are usually packaged in lots of 10 (ten) or more, in a box of stiff, heavy paper. Also packed in the box, is a folded, large sheet of paper, coated with a release agent, to which blank labels, suitably colored and lined, are releasably adhered. Various other types of imprinted labels are available for use in particular fields of endeavor (say, business accounting) to identify various documents routinely generated in that field. Such labels normally employ some type of indicia conventionally used with a preselected system of identification for various purposes in the field of business accounting.

Identification of the software is typically imprinted on a label by one who plans to use the diskettes (hereafter, the "user") for a particular application. The user of the blank discs labels each disk as it is recorded with information which is to be retrieved, amplifying details of the identification chosen for describing the information on the label, before it is manually positioned and secured within the label portion of the casing.

The user of the diskettes, may be an individual who will use only one or two diskettes at a time; or, a 'small user' who will use only a few diskettes, perhaps as many as a couple of dozen at a time; or, a 'large user' who may use several thousand at a time. A large user typically identifies diskettes by imprinting appropriate identifying indicia on a paper label, indelibly, with conventional permanent inks. Also identified, are usually the name of the creator of the software, the manufacturer, and distributor or other purveyor of the diskette, each of whom for simplicity, is hereafter referred to as the "seller".

The single label is adhesively secured with its major indicia-bearing portion on the label portion of the front side wall, and, a minor color-coded bottom marginal portion on the rear ("wrap-around label"). Some labels having only a major indicia-bearing portion (and no color-coded bottom marginal portion) are secured only in the label portion and do not extend around the bottom edge of the casing. Besides identification indicia, the label often also carries a warning that the software is protected by copyright, with the expectation that the imprinted label will remain on the diskette for its entire useful life, taking into consideration how difficult it is to remove a label from a diskette.

It is in the best interest of the seller of the software that the label, once adhered to the diskette's synthetic resinous casing, be non-removably adhered to the exterior surface thereof, so that the diskette may be manually handled a very large number of times without a significant risk that the label will be delaminated while the diskette is in use in the CPU; and also that the diskette may be stored essentially indefinitely without fear of having the label come off due to aging or oxidation of the adhesive bonding the label to the exterior surface of the casing. For durability, the casing is typically made from high impact styrene (HIPS), high density polyethylene (HDPE), or propylene (PP), appropriately filled with fillers, stabilized against degradation by heat and light with stabilizers, and colored with dyes or pigments.

Further, a seller who wishes to be remembered by the user, has no reason to want to remove a readily visible, identifying label from its substrate diskette.

These very reasons result in users, and particularly large producers of software, providing labels which are adhesively secured so tenaciously with a water-insoluble adhesive composition, that the high difficulty of removing the labels effectively thwarts any serious attempt to do so.

Particularly with casings of HDPE and PP, the logical way to remove a label would be to use a solvent since HDPE and PP are substantially insoluble even in commonly available aggressive solvents. Solvents such as acetone or methyl-isobutyl ketone (and 'finger nail polish remover'), xylene(s), toluene, tetrahydrofuran (THF), and many others, would appear to be able to penetrate through the paper and quickly dissolve the adhesive sufficiently to loosen it. However, even if the sidewalls were sealed (in most diskettes they are not) in fluid-tight relationship at their respective perimeters, and also sealed around the edges of a corner window in which a slide is movable to ensure that data on the storage disk will not be erased, there is an open circular central aperture about 2.7 cm (1.0625") in diameter, in one (rear or reverse) sidewall, through which solvent would enter the casing if the label was dipped in a bath of solvent. The lower portion of the periphery of the aperture is well below the upper edge of the indicia-bearing portion of the label (viewed with the slidable window as being the upper edge of the diskette). Solvent leaking into the casing around the periphery of the aperture will destroy the storage disk. The aperture is open for a metal driven disk about 2.5 cm in diameter (0.984") and about 2 mm (0.075") thick, upon which driven disk the storage disk is mounted for rotation about a central transverse axis (z-axis).

Clearly, the use of solvents known to dissolve the adhesive, do not lend themselves for use in this application because the diskette cannot be dipped into the solvent.

To avoid dipping a diskette, it has been bathed with a solvent, but this requires swabbing the label with solvent for too long a time. Most adhesives in current use are neither easily nor speedily dissolved at room temperature (20° C.) by such solvents. If the casing is solvent-sensitive, a portion of the casing is also dissolved.

Bathing or swabbing a diskette is successful only if used to remove residual adhesive, to 'finish clean' a diskette. Thus swabbing has been used to finish clean a diskette after the label has been laboriously scraped away with a sharp edge. (see article in IBM Users Forum; GO IBMNEW).

In any case, an attempt to bathe a label on the diskette sufficiently long with a suitable organic solvent, adequately to dissolve the adhesive, is both, too time-consuming and too frustrating to be justifiable. In practice, the relatively low cost of a diskette results in the old, labeled diskette being discarded as waste.

Since so much effort is devoted to labeling a diskette, whether it has been manually labeled, or labeled with a sophisticated apparatus for doing so, it appears incongruous then, to seek to remove the label. But removing an existing imprinted label is highly desirable if a diskette is to be recycled.

Not surprisingly, a seller will consider recycling its diskettes, only if there was a practical method for recovering an essentially "clean" diskette. Recycling once-used diskettes becomes particularly attractive in some not-so-unusual circumstances. For example, when a software program is found to have a "bug", or, the old program has been updated with a new program, and the former made obsolete, there may be several thousand diskettes, or sets thereof, which would be scrapped if they could not be economically recycled.

It will be evident that there can be a strong economic incentive for a seller to reuse the labeled diskettes of the no-longer-saleable diskettes, by the simple expedient of superposing a new identification label over the old. However, even if great care is exercised to position another label precisely over the first, it is difficult to hide the fact that a first label lies beneath the second.

In addition to corporate sellers of software, whether large entities or small, there are many individuals and organizations who use hundreds of diskettes for some specific project or projects, and each diskette is carefully labeled for obvious reasons. When one of the projects, or all the projects come to an end, and there is no reason to save the labeled diskettes, it is highly desirable that they be reused, not only from the standpoint of saving the cost of purchasing virgin diskettes, but also from that of conservation, to avoid dumping them to a landfill, incinerating, or otherwise disposing of the "used" diskettes.

Another occasion to recycle diskettes presents itself when a small user finds he has collected a multiplicity of diskettes on which data are recorded, but which he does not need to store. Much as the user would like to re-use those diskettes, the impracticality of delaminating the old labels from the casing of the diskette, and the unsightly result of superimposing a new label over the old, results in the labeled diskettes being discarded.

Most purchasers of software do not want to purchase software which is sold in an overtly "used" diskette even if they are well aware that a properly "recycled" diskette is of no less quality than a fresh, new or 'virgin' diskette.

Because, to date, the labels cannot be removed by any practical method without damaging the recording medium within the casing of the diskette, or the casing itself, those who wished to reuse or 'recycle' a labeled diskette for any one of the foregoing reasons, inter alia, either placed a second label over the first, or painstakingly scraped the printed label off the casing of the diskette. Even scraping a label off is not satisfactory because much, if not most of the adhesive remains on the casing, causing a fresh label to be wavily or non-planarly re-adhered on the casing.

On the assumption that one is not averse to recycling a diskette and re-identifying it by a second label superimposed on the first, it will be evident that re-using the diskette for successive documents, each of which are correspondingly identified with new labels, successively superimposed one upon the last preceding one, will soon result in a thickness which will not permit the diskette to be slidably inserted in its slot in the CPU. Even if the slot was able to accommodate a diskette with multiple labels laminated one upon another and to the casing of the diskette, most users of diskettes have a marked aversion to re-using diskettes with multiple overlaid labels, if for no other reason, because of the peculiar aesthetics which are inculcated in PC users.

Finally, in view of the fact that the manufacturers of 5.25" floppies, 3.5" diskettes and other magnetic devices for storing data, usually caution against storing such devices in a hot room, users are careful to avoid exposing diskettes to heat. It is well known that diskettes are heat-sensitive. Yet, it is heat, precisely applied for a short time, which provides the solution to the problem. Moreover, a preferred device in which the diskette(s) can be heated, is simple in construction, the basic structural and control elements of the device being well known in the art of toasters for toasting slices of bread and the like. The simple construction of such a device, whether for cleaning only one diskette at a time, or plural diskettes at a time, in a batch operation, or cleaning a multiplicity of diskettes continuously, makes the de-labeler of this invention the key to recycling already-labeled diskettes.

A continuous diskette heater is constructed with the same principles in mind as in a continuous toaster for slices of bread which must be toasted to the "just right" color without being overly darkened or charred.

This invention is directed to a practical solution to the problem of removing a label, which is non-removably adhesively secured to a "standard" diskette with a thin layer of heat-sensitive adhesive, without damaging either the casing of the diskette or the storage disk on which data is to be magnetically stored, and more specifically to the problem of cleanly parting the label from the surface of a diskette without leaving a substantial amount of adhesive on the surface of the diskette. The best solution to the problem is to remove the label when the adhesive bond has been vitiated sufficiently to cause viscous deformation of the adhesive layer, to cause adhesive failure where the adhesive exhibits a higher degree of elastic response or rubbery behavior, so that the label can be parted cleanly from the surface of the label portion of the casing.

SUMMARY OF THE INVENTION

It has been discovered that a conventional paper label, or other indicia-bearing laminar substrate, adhesively secured to a "standard" 9 cm (3.5") diskette substrate, may be manually removed with very little effort, generally without tearing the label, to leave a substantially adhesive-free surface on the substrate by heating the diskette to an elevated temperature for a short interval, less than one minute, during which the adhesive layer undergoes viscous thermal deformation, but which temperature is low enough, and the interval is short enough, so as not to deleteriously affect either the casing of the diskette, or, the recording medium encased therein.

It is therefore a general object of this invention to provide a simple method for removing a label from the casing of a diskette in a batch operation, comprising the steps of: loading the diskette(s) into a receptacle means disposed in a heating zone of a de-labeling means, commencing to heat the diskette(s) to a suitable temperature without distorting the casing or damaging the floppy disk storage medium until the thin layer of adhesive is viscously thermally deformed; setting a timer to stop heating the diskettes when viscous deformation of the thin layer provides a peel strength of less than that required to tear the label away at the surface, typically less than 30 lb-force; and, removing the diskettes while still hot, so as to allow one to manually remove the heated labels before the thin layer cools sufficiently to regain its adhesive strength.

It is also a general object of this invention to construct a diskette de-labeler using easily available structural elements which cooperate with surprising effectiveness to cause viscous deformation of the adhesive or decrease the viscosity of an adhesively secured label sufficiently to loosen the adhesive bond of the label to the casing of the diskette, and enable the label to be manually removed.

It has been further discovered that the label portion of the casing of a diskette, and the labels which are non-removably secured to the surface of that portion with a PSA commercially used for such purpose, may be removed without using a solvent, by heating to a temperature in the range from 32° C.–65° C. (90° F.–150° F.), preferably in the range from 49° C.–65° C. (120° F.–135° F.), for an interval of time in the range from 5 to 30 seconds, in inverse relationship to the temperature at which the diskette is held, whereby the adhesive is sufficiently heat-fluidized to enable the label to be manually peeled away from the casing of the diskette with a force in the range from 0.5 lb-force to about 20 lb-force, preferably 1–10 lb-force, without distorting or otherwise damaging either the casing or the magnetic recording medium encased therein.

It is also a general object of this invention to provide a method for removing a label adhesively secured to another label, or, to the exterior surface of a "standard" 9 cm (3.5") diskette having an upper portion upon which a slidable gate, whether a metal or synthetic resinous shield, is slidably fitted, a front laminar face ("labeled face") for labeling the diskette with a label, and a rear centrally apertured face which is unlabeled ("unlabeled face"), except for a lower bottom marginal portion of the label which wraps around the lower edge of the diskette, comprising, confining the diskette in an asymmetric heating zone comprising a heated portion and an opposed predominantly unheated portion, so that the labeled face is directly opposed and adjacent to opposed generally planar heating means in the heated portion, the unlabeled face being directly opposed and adjacent to the predominantly unheated portion; exposing the labeled face to enough heat to maintain the labeled face at a temperature in the range from 90° F. to 150° F. for less than 30 sec, preferably 10–20 sec, to decrease the viscosity of the adhesive enough so that the adhesive bonding of the label to the surface of the diskette is substantially negated, without deleteriously overheating the casing of the diskette and the rotatable storage disk held therein, removing the diskette from the asymmetric heating zone, and, manually removing the heated label from the heated diskette before the adhesive cools sufficiently to regain the adhesive bonding lost by heating.

It is a specific object of this invention to provide a method for delaminating an adhesively secured paper label from the label portion of a diskette by selectively heating the label portion to a temperature in the range from 49° C.–65° C. (120° F.–135° F.), for a short interval of from 10 to 30 sec, and removing the label while the adhesive is sufficiently fluid so that a force in the range from 1 lb-force to 5 lb-force will part the label from the label portion of the diskette.

It is still another object of this invention to provide a continuous process for continuously delaminating labels from the diskettes to which they are adhered, comprising, passing a multiplicity of diskettes, successively through an asymmetric heating zone comprising a heated portion and an opposed predominantly unheated portion, so that the label portion is directly opposed and adjacent to a generally planar heating means in the heated portion, the uncovered portion being directly opposed and adjacent to the predominantly unheated portion, preferably open to the atmosphere, so that unequal areas of front and rear surfaces of the casing are directly heated; maintaining each diskette in said asymmetric heating zone for less than 30 sec, so as to expose the labeled face of each diskette to enough heat to maintain the label portion at a temperature in the range from 32° C. to 65° C., and sufficiently decrease the adhesive's viscosity enough so that the adhesive bonding of the label to the surface of the diskette is substantially negated, without deleteriously overheating the casing of the diskette and the rotatable storage disk held therein; removing the diskettes successively from the asymmetric heating zone; and, manually removing the heated label from each heated diskette before the adhesive cools sufficiently to regain the adhesive bonding lost by heating.

It is still another general object of this invention to provide a simple device for heating a label to a desired temperature and time within a "peeling window" prior to manual removal of said label, said diskette having a casing in which is captured a storage disk protected by opposed planar foam pads, a front label portion extending over at least about 60% of a front sidewall, and a rear label portion extending over about 15% of a rear sidewall, and a laminar label adhesively secured to said front and rear label portions, comprising, a housing having a receptacle adapted to hold said diskette; opposed first and second heating means mounted in said housing in predetermined spaced-apart relationship, said first heating means extending over a sufficiently large area coextensive with said front label portion and adapted to directly heat it, said second heating means extending over a sufficiently large area coextensive with said rear label portion and adapted to directly heat it; support means defining said receptacle disposed within said housing and intermediate said first and second heating means, to support said diskette delimited by a pair of opposed biasing means, and maintain said diskette in predetermined spaced-apart relationship with said first and second heating means; control means including (i) a timer element to provide a predetermined duration of current of requisite amperage and continuous voltage, (ii) a starting switch means, (iii) a selector circuit for selecting only said first heating means, (iv) a power supply, and, (v) a signal means recognizable by human senses, said control means being each connected to said power supply so as to provide power to said first heating means only, or to both said first and second heating means.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
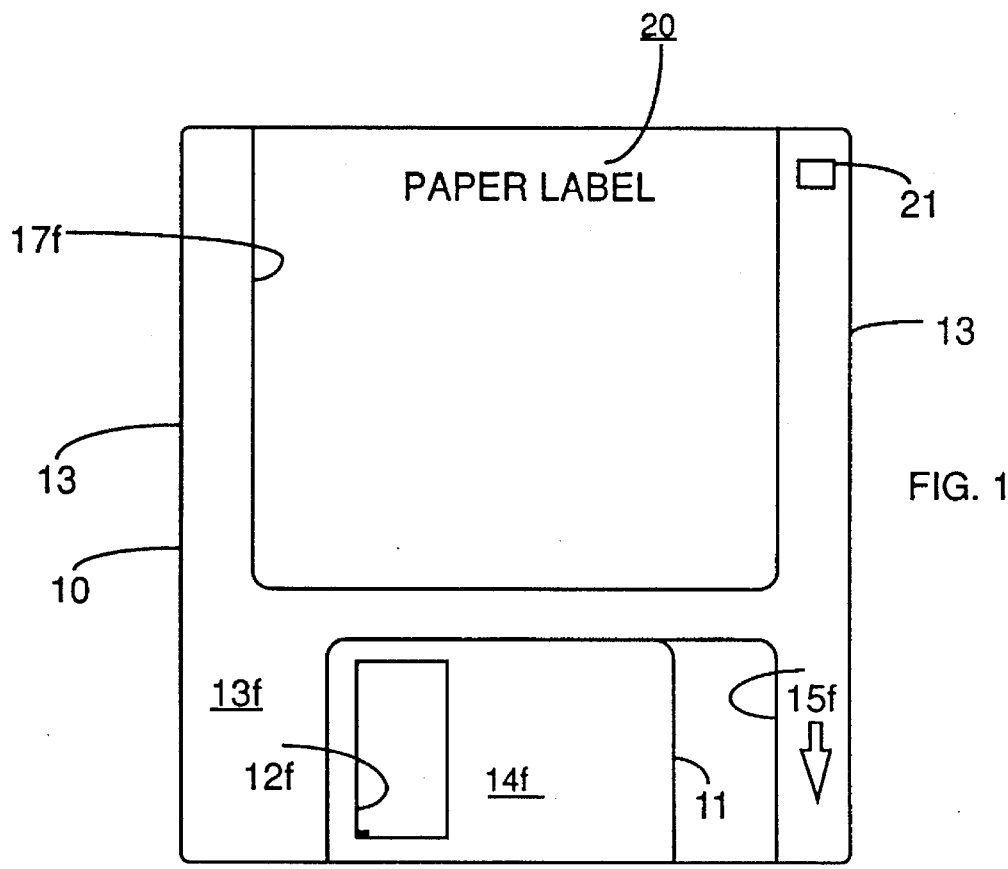
FIG. 1 is a plan view of the front sidewall of a conventional "standard" 9 cm (3.5") diskette which has been labeled with a conventional printed label adhesively secured on the labeled surface in the lower recessed portion of the front sidewall.
Figure 2:
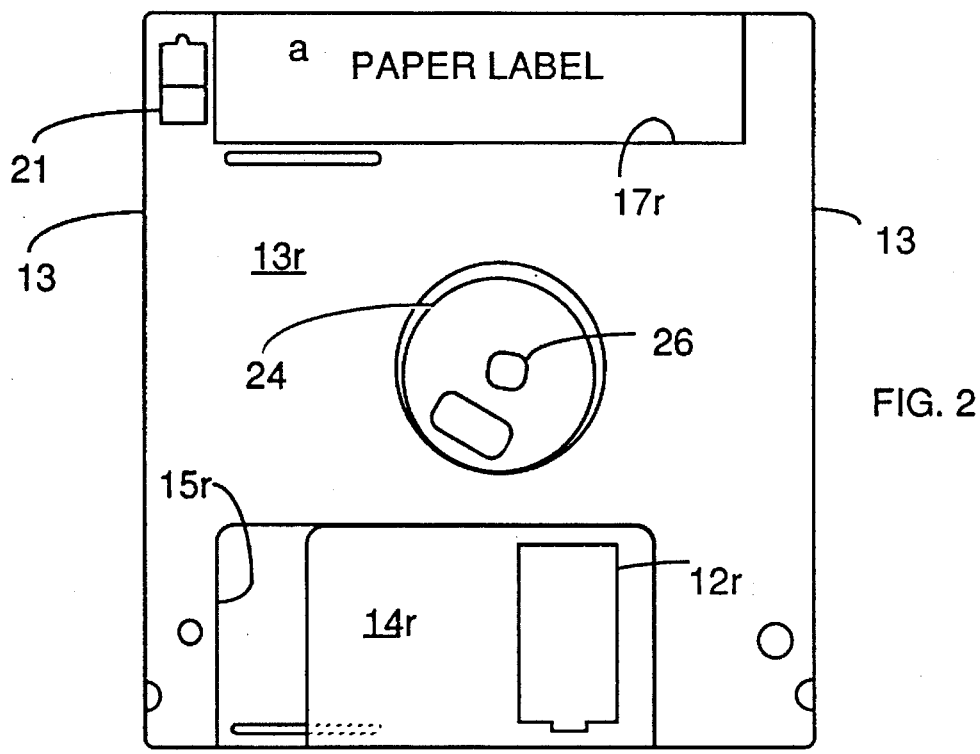
FIG. 2 is a plan view of the rear sidewall of the diskette showing the bottom marginal portion of the label (shown in FIG. 1) folded around the lower edge of the diskette and adhesively secured in the lower recessed portion of the rear sidewall.
Figure 3:
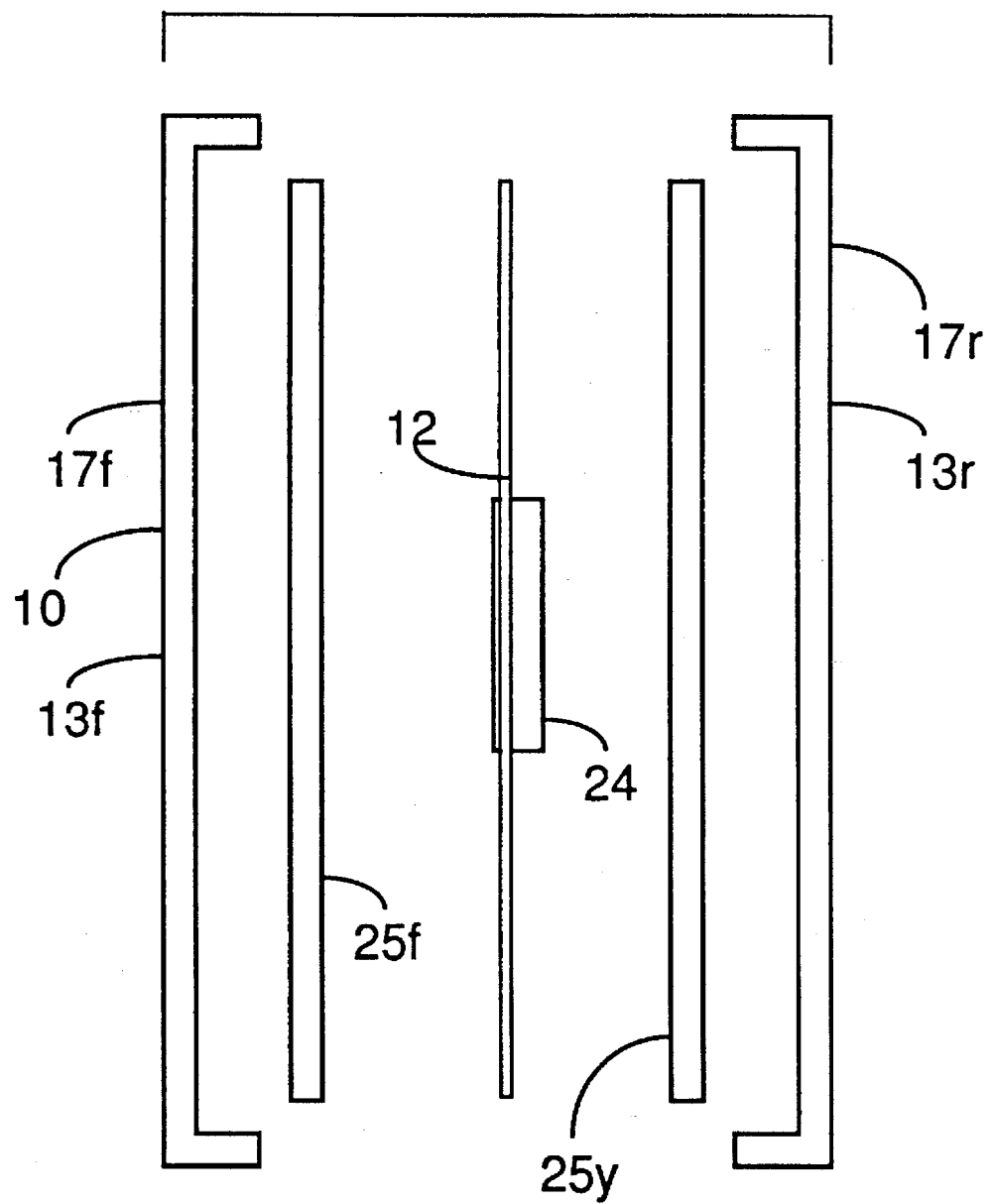
FIG. 3 is a diagrammatic sketch of a cross section of the diskette showing the positioning of the storage disk between pads of foamed fabric of non-magnetic polymer which provides the storage disk which rotates between the pads, with additional protection against heat, because of their substantial insulating effect.

Referring to FIGS. 1 and 2 there is shown the front face of an "upside down" (heating position) 9 cm diskette 10, having a channel-shaped slidable gate 11 supported on, and straddling the upper edge of the diskette. The gate 11, thus supported, is movable in a to-and-fro movement in the longitudinal (x-axis) direction, to uncover, then cover, an open slot (not visible behind the gate 11) referred to as the "reading window" in the upper marginal portion of the casing 13, through which open slot a storage disk 12 (the storage disk is shown in FIG. 3) would be visible if it was not covered by the slidable gate.

The front 14f, and rear 14r, channel sides of the gate 11 (the channel's front side 14f is visible in this view) each have apertures front, 15f, and rear (15r, is not visible in this view) respectively, cut in generally rectangular shapes out of the sides of the gate. The gate 11 is formed either of metal or of a tough substantially rigid polymeric sheet. The width of each (measured in the x-axis) aperture is greater than that of the covered slot in the casing 13. The sides 14f and 14r of the channel together snugly embrace the upper portion of the diskette and lie flat upon front 16f and rear 16r rectangular depressions in the upper portion of the casing 13, each depression being inwardly off-set from the planar face of the diskette by about 0.25 mm (0.010").

The lower portion of the casing 13, like the depressions 16f and 16r, is inwardly offset about 0.2 mm (0.008") to provide lower front and rear depressions, 17f and 17r respectively, in the lower portion of the casing, which depressions allow a label 20 to be adhesively secured within at least 17f the "label portion" on front depression without the printable surface of the label rising above the planar front face of the diskette.

The casing 13 is formed by permanently joining front and rear sidewalls 13f and 13r respectively, along their peripheral inner margins (see FIG. 3) having peripheral lips 19f and 19r, the thickness of which in abutting engagement, provides a preselected spacing for the storage disk between the sidewalls. The overall dimensions of front 13f and rear 13r sidewalls are identical, as are the dimensions of the front and rear depressions 17f and 17r, in the upper portion of the sidewalls. The front depression 17f for the label 20, is about 60% of the planar area of the front sidewall 13f, and provides enough area for the major portion of the label 20; while the area of the rear depression 17r for the bottom marginal portion of the label (in the rear sidewall 13r), is less than 25%, usually only about 15% of the overall area of the sidewall.

At least one coding through-aperture 21 for coding the diskette as to whether its storage disk can be electronically written upon, is located in the lower recessed position of the casing 13, and on one side thereof.

As seen in FIG. 2 in which the rear view of the diskette is shown, the central portion of the rear sidewall is an open circular aperture 23 within which is confined a rotatable metal disk 24, to which is fixedly attached the storage disk 12. A square central aperture 26 in the metal disk 24 engages a drive shaft (not shown) in the computer's processing unit.

Reverting to FIG. 3, there is shown a greatly exaggerated schematic illustration (not to scale) of the components of a diskette as they appear in an elevational side view. The front and rear sidewalls 13f and 13r respectively, are equidistantly spaced from the storage disk 12 which is protected by a pair of foam pads 25f and 25r between which the disk 12 is rotatable when used in a processing unit. The reading window through which the disk is read, is not visible in this view.

It then became necessary to determine, experimentally, the duration over which a diskette must be maintained at a temperature high enough to cause the necessary viscous deformation or heat-fluidization of the adhesive which would be sufficient to part the label from the label portions 16f and 16r. A critical limitation on that temperature would have been exceeded when the temperature required to delaminate a label from the labeled surface of a diskette renders the diskette unusable to store electronic data.

It was then found that typical casings now used in commercially available diskettes, suffer unacceptable heat distortion if the surface temperature of a sidewall is maintained at above 140° F. for more than about 10 sec. The distortion suffered was sufficient to defy insertion of the diskette into the receiving slot of the processing unit. Thus, the critical temerature for removal of the label was that temperature at which unacceptable distortion of the casing occurred.

Figure 4:
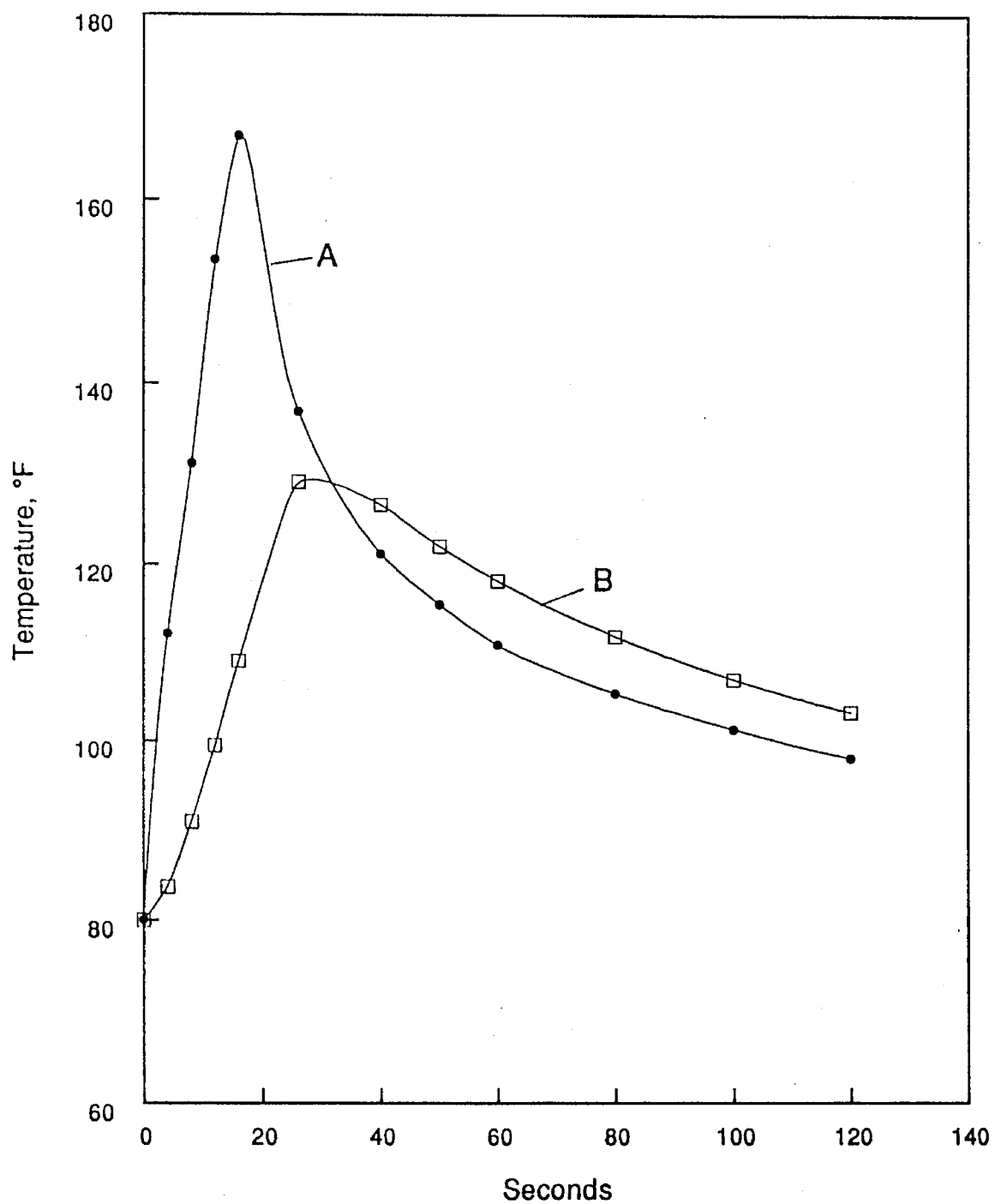
FIG. 4 is a graph presenting two curves A and B showing the average temperatures, as measured with exterior and interior thermocouples adhesively secured to the front label portion on the sidewall, with a conventional label having a PSA on its reverse surface. The sidewall is about 1 mm (0.035") thick. The test diskettes were positioned 3" directly in front of, and in parallel relationship with the plane in which lie the surfaces of red-hot Nichrome ribbon heating elements of a conventional 1500 watt space heater which was kept "ON" during the test.

The following experiments, the results of which are presented in FIG. 4, helped to determine the critical parameters for a typical paper label supplied with a box of diskettes. The label his coated on one surface with an adhesive believed to be based on a A-B-A triblock copolymer where A is polystyrene and B is either polyisoprene or a polybutadiene unit, commercially available under the Kraton trademark from Shell Chemical.

A diskette made by a particular manufacturer (Verbatim), was used to determine, by trial and error, that at a fixed distance of 3" from the hot surface of Nichrome heating element of a 1500 watt space heater (heat source), if the label portion was exposed for 16 sec, that surface was heated at a desirable rate such that there is some latitude on the time (before heat distortion of the sidewalls 13f and 13r set in).

For this fixed distance of 3" the rates at which the temperature of the exterior and interior surfaces of front sidewall 16f increased, were then determined during a period of 16 seconds, while the diskette was being heated.

After the exposure to the heat source was terminated, the diskette was removed from the heat source and held at room temperature (20° C.), to determine how long it took for the exterior surface to cool down to a temperature which was (i) high enough to cause cohesive failure of the adhesive layer, as evidenced by a large portion of the adhesive being left on the surface of the label portion, when the label was manually parted from the label portion of the diskette; (ii) just high enough to cause adhesive failure of the adhesive layer, as evidenced by essentially all the adhesive remaining on the back of the paper label when parted; and, (iii) too low to provide sufficient viscous deformation to allow the label to be parted without the paper being torn, or to provide a significant decrease in viscosity of the adhesive, indicating that upon cooling, the label became re-adhered too strongly to be easily removed.

For the fixed distance of 3" from the aforementioned ribbon element heat source, an unknown thermal conductivity of the synthetic resinous material used to make the casing (believed to be HDPE), and a 0.035" thickness of the sidewalls, the curves A and B provide a record of the temperature differences as a function of time between the exterior label portion on sidewall 13f and its inner surface, resp'ly, as the increases were continually monitored.

The monitored temperature differences for the curves A and B reaches a maximum of 57° F. after 16 sec, and thereafter decreases as follows:

after 20 sec the temp diff is 35° F.

after 25 sec the temp diff is 4° F.

and, after 30 sec the temp diff is about 0° F. or 0° C.

Soon thereafter, as the temperature of the exterior surface of the sidewall continues to cool, the temperture of the interior surface of that sidewall eventually begins to exceed the exterior surface temperature difference.

It is evident from curve A, that for an adhesive having a glass transition temperature (Tg) of about 120° F. and a viscous deformation temperature from 2° to 10° F. thereabove, it takes 30 sec before the exterior temperature decreases below the upper limit (130° F.) of the viscous deformation temperature. One can now see that one has about 30−16=14 sec (with a peak temperature difference of 57° F.), after removing the diskette from the heating zone, to remove the label without tearing the paper.

Though it is found that very little force is required, if the label is parted at a temperature above 130° F. (for the particular adhesive used on the test diskette), much of the adhesive which was coated on the surface of the sidewall as a thin layer, remains on the surface of the sidewall. This indicates that there is "cohesive failure" of the adhesive layer, and typically remnant heated adhesive is thermally degraded and oxidized.

To obtain a clean sidewall surface, remnant adhesive is simply dabbed off with the remnant adhesive on the removed label, by a patting action. Alternatively the adhesive surface of an unused label may be used, or any surface which provides a sufficiently higher surface energy than the remnant adhesive on the sidewall (ordinary paper does not have enough). In no event is it either necessary or helpful to use a solvent, and the use of solvent in contact with the casing is not recommended.

Since there is sufficient viscous deformation remaining after the exterior surface has cooled below 130° F. (say), that is about 10° F. below the upper limit, or to 120° F. (the Tg), the label can still be removed without tearing, but as the temperature approaches the Tg, the force required to remove the label approaches the force required to tear the label.

Between the Tg and the upper limit, for example, when the exterior surface has cooled about 5° F. below the upper limit, that is to 130° F.–5° F., or to 125° F. which is 5° F. above the Tg, the label is parted with medium force and the surface of the sidewall appears to be essentially adhesive-free. This indicates the adhesive layer failed in "adhesive failure".

Figure 5:
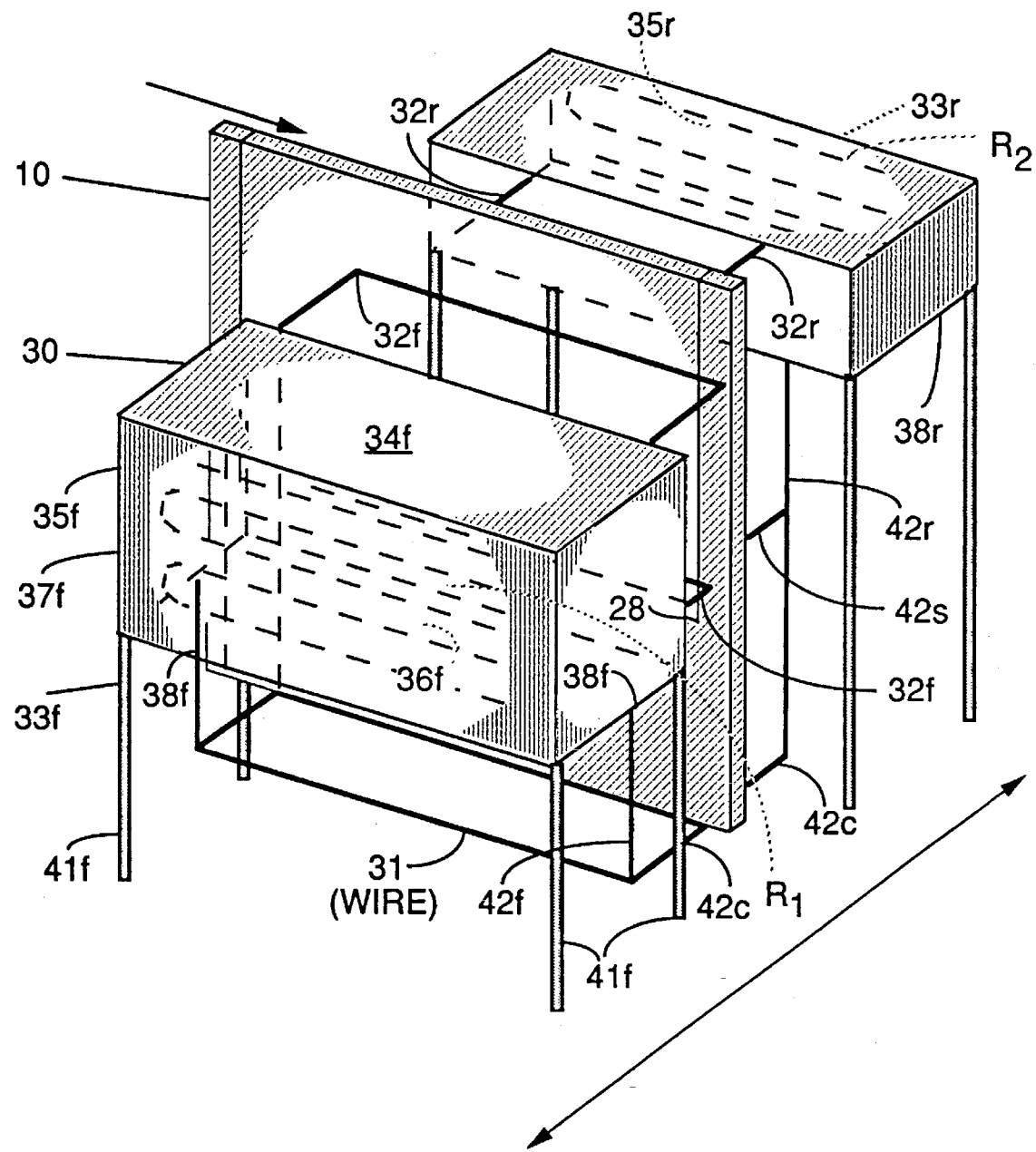
FIG. 5 is a perspective view schematically illustrating a single diskette de-labeler in which a diskette is placed on edge, vertically with its labeled portion up, between opposed asymmetrically disposed resistor heating elements with appropriate controls in a heating zone. Only the labeled portion of the diskette is directly exposed to heat from the elements, and the duration of exposure is controlled (hence referred to as a "radiation de-labeler".

Referring to FIG. 5 there is shown a de-labeler, indicated generally by reference numeral 30, for a single diskette 10 held, upside down, that is, label portion up, in a rectangular wire mesh cradle (portion shown) 31, between wire grid spacing means 32f and 32r disposed on each opposing open face of front and rear heater boxes, indicated generally by 33f and 33r, respectively. The reason the diskette is located upside down is to allow heated air to rise past the labeled surfaces of the diskette, and allow cool air to flow over the unheated portion of the diskette before the air flows over the heated portion. It will be evident that the orientation of the diskette will not make a substantial difference in the effectiveness of the removal of the label, but it makes a substantial difference in the amount of heat which is transferred through the sidewall to the interior of the casing despite insulation.

The front heating means includes a heating means, comprising a heater box 33f and resistance heating element $R_1$. The heater box 33f has a top wall 34f and front wall 35f, preferably with a reflective inner surface 36f to reflect heat energy emanating from electrically heated resistance means $R_1$. A continuous ribbon heating element provides a desired predetermined heat output per unit area of the interior surface of the front wall 35f, over which the ribbon is trained and attached as it traverses, back and forth in a vertical plane, over an area corresponding to that occupied by label 20 directly in front of the heating element $R_1$. The vertical height over which the ribbon radiates heat is about 5.7 cm (2.25"). If desired, the heating element may include several ribbon elements $R_1$, appropriately connected in a circuit.

In a manner analogous to that just described, the rear heater box 33r comprises a heater box 33r and a ribbon heating element $R_2$ which traverses the interior of the rear sidewall 35r, coextensively over the area over which the rear portion of the label is adhered, to heat that portion of the label adhered to the bottom rear marginal portion of the casing. The heater box 33r has fore and aft walls 37r and the rear wall 35r is preferably provided with a reflective inner surface 36r.

The resistance elements $R_1$ and $R_2$ are chosen and mounted in the heater boxes 33f and 33r so that each radiates approximately the same amount of energy per unit open area of the face of a heater box, to heat the front and rear label portions uniformly.

Opposed fore and aft sides 37f of the heater box 33f, on either side of the heating element $R_1$, the top 34f, and the bottom 38f of the heater box 33f, together confine and direct the radiant heat energy from the element $R_1$ outward through the open box, directly at the label. The boxes 33f and 33r are open, except for the wire spacing means, or diskette spacers 32f and 32r on the front and rear heater boxes respectively, to maintain the desired distance of the label surface (about 7.75 cm or 3") from the generally planar ribbon element heating means.

The spacers 32f and 32r, are provided by pieces of bent wire, one spacer 32r on box 33r; and two spacers 32f, one above the other, on box 33f. Each piece of wire is bent to provide three sides of a rectangle, the two sides of equal length spacing the label at a desired distance from the ribbon heating elements, e.g. about 7.75 cm (3"). The third side of the rectangle, a length of wire along the longitudinal x-axis is about the width of a label, about 7 cm (2.75"). The two equal sides of the rectangle are secured across each open heater box, by their terminal ends to the boxes, preferably on the fore and aft sides 37f and 37r; spacer 32f on sides 37f, and spacer 32r on sides 37r. Each spacer across a heater box lies in a horizontal plane at right angles to a vertical plane between opposed spacers, in which the plane the diskette is to be positioned by being held between the spacers.

The front 33f and rear 33r heater boxes are each supported on vertical support rods (legs) 41f and 41r, respectively, the legs 41f being shorter than the legs 41r because of the difference in the heights of the heater boxes.

Figure 6:
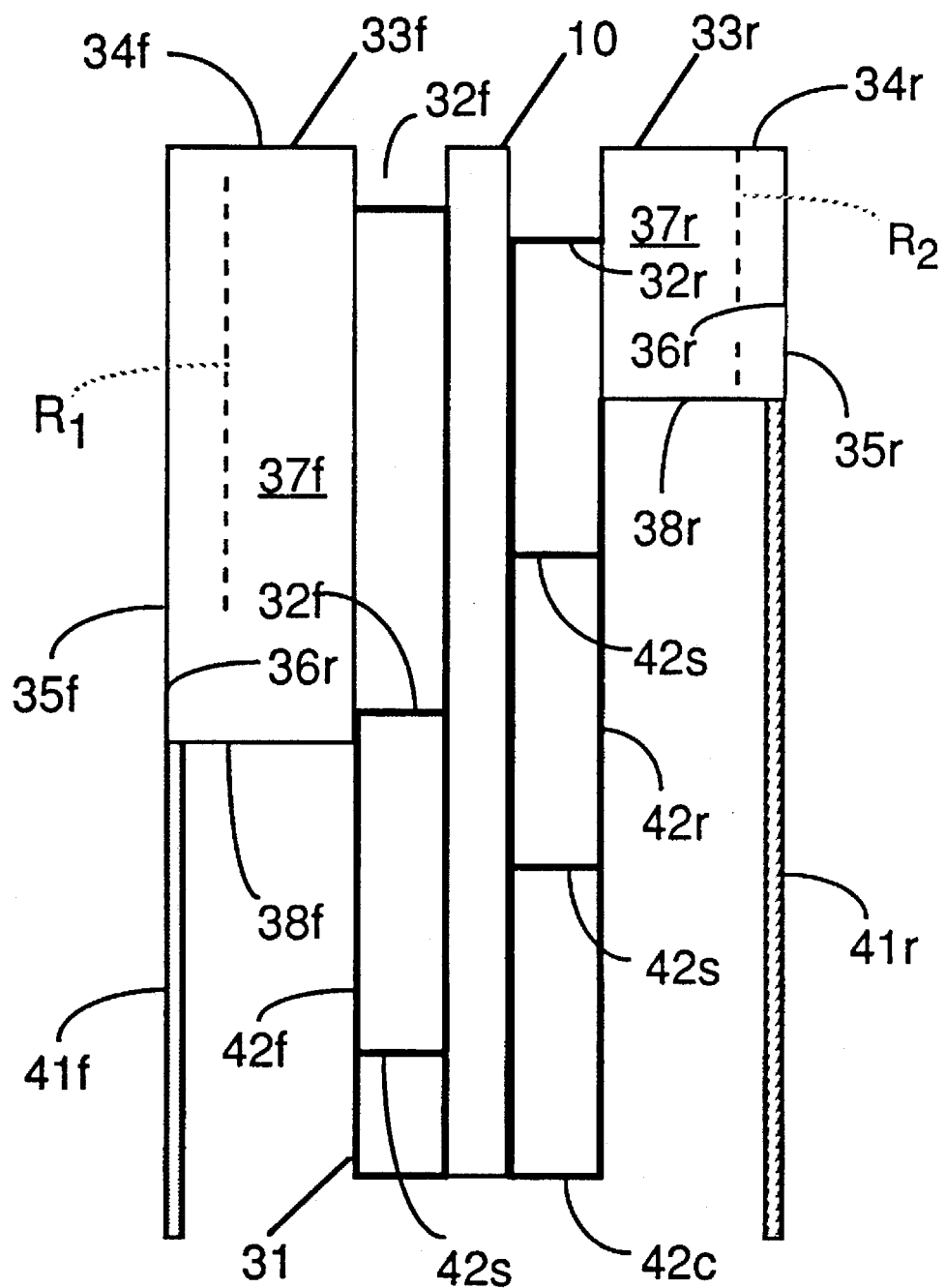
FIG. 6 is a side elevational cross-sectional view taken along the central axis (x-axis) 6—6 in FIG. 5.

FIG. 6 is a side elevational view of the single diskette labeler showing how only the label portion of the diskette is heated by radiation and convection, allowing the remaining portion to be cooled by ambient air.

The wire mesh cradle 31 is supported between the heater boxes 33f and 33r, and, with the spacers 32f and 32r, provides a receptacle and locating means in which the diskette 10 is snugly, slidably, and removably supported on edge. The cradle 31 is economically constructed of two or more pieces of wire each bent to have a first, short vertical section 42f about the height of the depression 15f; and a second, longer vertical section 42r, having a height about that of the diskette minus the height of the rear depression 17r in which the bottom marginal portion of the label is wrapped around. These sections 42f and 42r are spaced apart from each other by a third relatively long connecting section 42c (preferably not more than 3") which spaces the heater boxes at an appropriate distance from each of the surfaces of a diskette. Each end of the vertical sections 42f, and, of the longer vertical sections 42r are secured to the bottoms 38f, 38r of the front and rear heater boxes 33f, 33r respectively.

Wire section 42c also supports the edge of the diskette 10, open in cradle 31 to the atmosphere, and locates the diskette vertically. Rectangular opposed spacers 42s of bent spring wire, analogous to the spacers 32f and 32r, connect the fore and aft vertical sections of the cradle; one spacer 42s between fore and aft sections 42f; and two spacers 42s between fore and aft sections 42r. The spacers 32f, 32r on the boxes, and the spacers 42s on the cradle, together provide opposing bias to a diskette lodged between them.

The lower portion of the wire cradle is thus open to the atmosphere to help keep the unheated portion of the casing cool. It dissipates heat while the remaining diskette is being heated. The dimensions of the heater boxes 33f, 33r and of the cradle 31 are such that the margins of the diskette on either side of the label 20, protrude into the atmosphere, so as also to help keep the casing cool. This allows one to remove the hot diskette from its cradle 31, and to peel away the label manually.

It will now be evident that, for the typical diskette having a "wrap-around" label, as long as the area of the planar faces of the sidewalls are heated relatively uniformly, the means used to position the diskette are not critical. The wire mesh cradle between heater boxes is simply an unexpectedly simple device in which to hold and heat the diskette sufficiently to provide adhesive failure of the thin layer of adhesive, reliably and reproducibly.

If diskettes having a label only on the front label portion ("single front labels") are to be de-labeled, it is unnecessary to have a rear heating means. In general, however, a de-labeler is desirably constructed to also delabel diskettes which have a wrap-around label.

To discharge both functions, but to avoid the additional cost and risks associated with unnecessarily heating the rear label portion, the de-labeler is provided with a selector circuit (see FIG. 7) for selecting only said first heating means, which is included in the control means for maintaining the desired temperature between the front and rear heater boxes, for a predetermined time. Maintaining surfaces of the diskette which are not heated, open to the atmosphere, provides additional cooling, allowing heating to a higher temperature and at a faster rate of heating, than if one heated the entire planar surfaces of the diskette.

Figure 7:
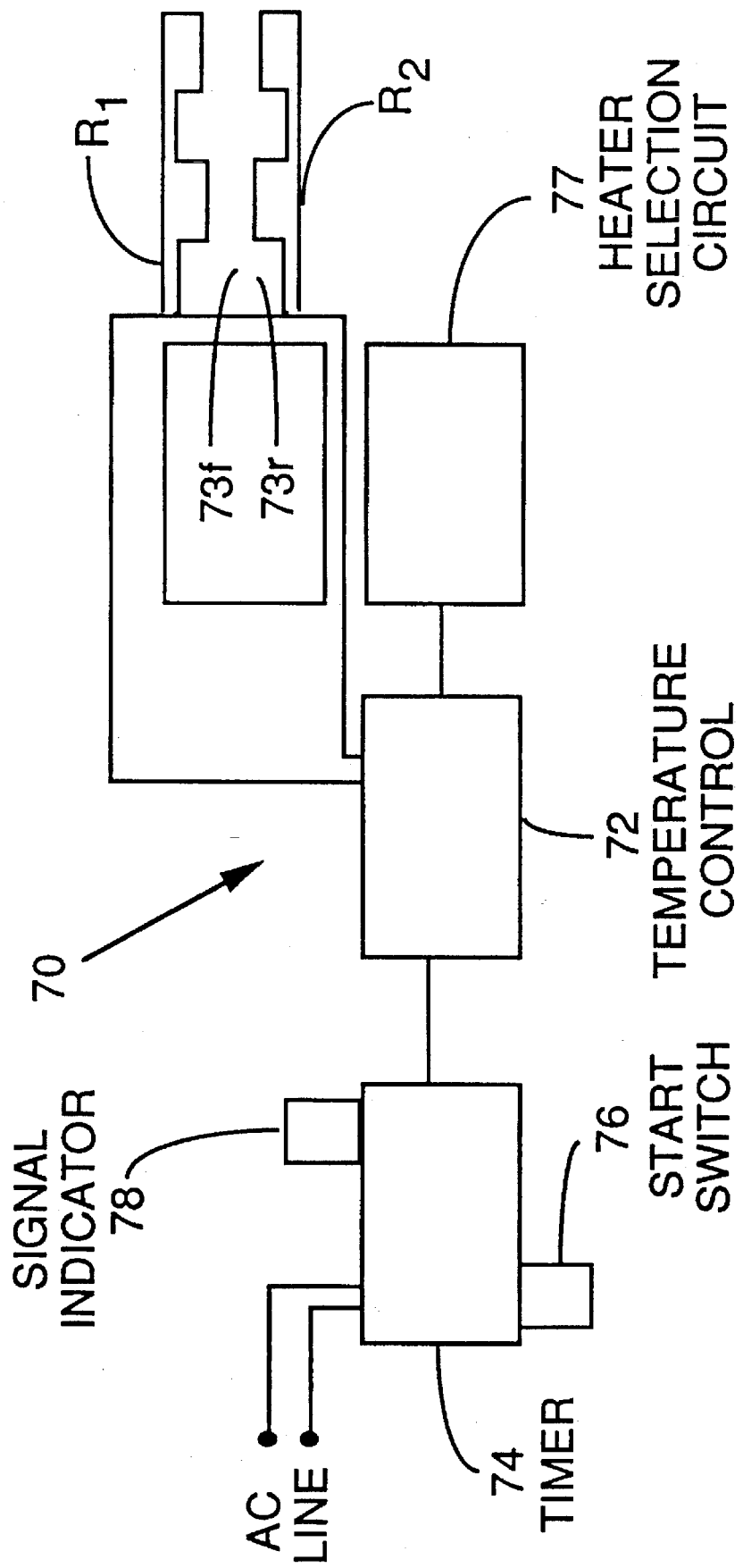
FIG. 7 is a block diagram which complements the description of a circuit for a de-labeler, better to understand the basic requirements of the circuit.

As schematically illustrated in FIG. 7, the de-labeler identified generally by reference numeral 30, is provided with a control means 70, to control the exposure of the front and rear label portions of the diskette. The control means 70 includes a temperature control means 72 of conventional design which includes temperature sensing means 73$f$ and 73$r$ located intermediate the opposed heating surfaces of first 33$f$ and second 33$r$ heater boxes. The sensing means 73$f$ and 73$r$ includes a bimetallic strip or other known means to complete the circuit and provide current to the resistance elements $R_1$ and $R_2$ when the respective temperatures adjacent a vertical plane equidistant from the resistance heating elements drops below a desired temperature. For each heating element, when the desired set temperature is reached, the respective sensing means breaks contact, discontinuing the current and maintains the desired temperature.

The time of exposure is controlled by a timer control element 74 of known construction, to provide a predetermined duration of current of requisite amperage and continuous voltage. The control means 70 also includes a starting switch means 76, and a signal means 78 which generates a signal recognizable by human senses, and which signal means is triggered when the desired time of exposure has elapsed. The control means is connected to a conventional utility current source such as a 110 V AC or 220 V AC current, commonly available.

As indicated above, the control means 70 desirably also includes, optionally, a selector circuit 77 which allows one to choose to heat only the front label portion of a diskette when it does not have a wrap-around label.

Figure 8:
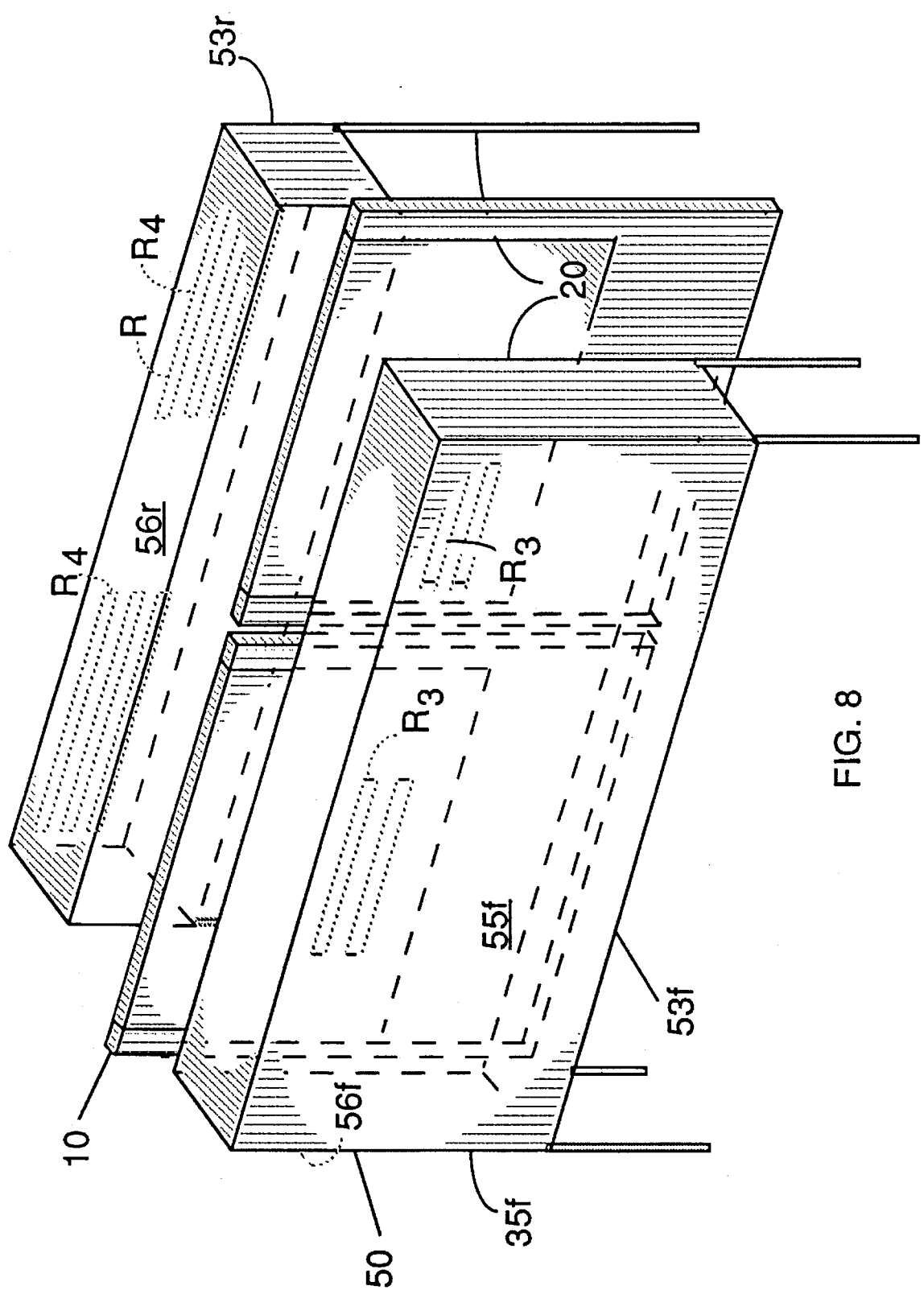
FIG. 8 is a perspective view schematically illustrating a twin de-labeler in which two diskettes may be heated simultaneously by radiation and conductive heating.

For greater efficiency in de-labeling a multiplicity of diskettes, it might be desirable to construct a dual-diskette de-labeler which would allow one to peel the labels off two diskettes at a time. Such a device, shown in a schematic illustration in perspective view in FIG. 8, is identified generally by reference numeral 50. It is easily constructed by using double-length sidewalls 55$f$ and 55$r$, the length of each of which sidewalls is about twice the width of a diskette, and the remaining portions of the two heater boxes 53$f$ and 53$r$ are constructed in a manner analogous to that in which the heater boxes 33$f$ and 33$r$ are constructed. Opposed, spaced-apart, first and second resistance heating means $R_3$ and $R_4$ are fixedly disposed in the heater boxes 53$f$, 53$r$ against the interior reflective surfaces 56$f$ and 56$r$ of the sidewalls 55$f$ and 55$r$, respectively.

In a twin de-labeler, as in the single diskette delabeler 30, a pair of diskettes 10 are held and heated in a predominantly radiant heating zone generated by opposed front 53$f$ and rear 53$r$ heating means, the front 53$f$ radiating energy over a larger area than the rear 53$r$. As with a single de-labeler, there is also a substantial amount of heat energy contributed by convective heat transfer due to heated air flowing in contact past the label portions of the diskettes.

It will be seen that the structural elements of the twin de-labeler, in planes orthogonal to the the horizontal, e.g. elements such as the fore and aft walls 37, and cradle sections 42$f$ and 42$r$, correspond to those of the single diskette de-labeler shown in FIGS. 5 and 6. In the twin (or dual) de-labeler, the diskettes 10 are located in a vertical plane by the connecting section 42$c$ (which will be the same length as in FIG. 6 if the energy received per unit area of label surface is the same) positioned between spacers 32$f$ and 42$s'$ in front of diskettes 10 which rest on connecting sections 42$c$ held of the cradle 31". The cradle 31" now extends along the bottoms of both heater boxes, for about twice the lengths of the corresponding cradle 31 of the single de-labeler 30. Spacers 32$r'$ and 42$s'$ are biased against the rear of the diskettes lightly pressing the diskette against the spacers 32$f$ and 42$s'$ (the spacers 42$s'$ on each side are essentially the same, and are given the same reference numeral; similarly, spacers 32$f'$ and 32$r'$ like 32$f$ and 32$r$, could be the same, but are given different indiciae, for clarity.

Figure 10:
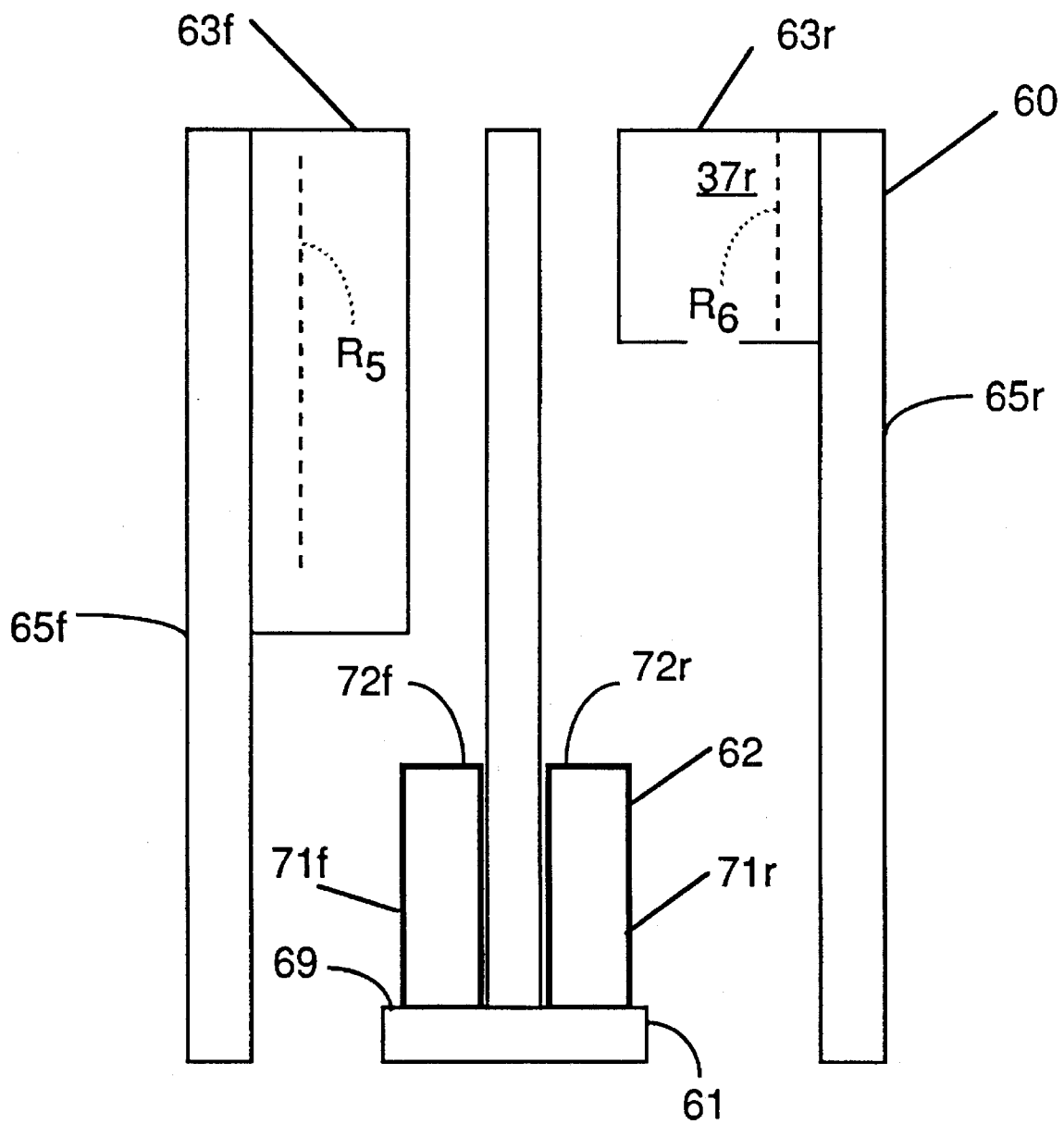
FIG. 10 is a side elevational view schematically illustrating a continuous "radiation de-labeler".

For commercial use, it is preferred to have a continuous de-labeler such as is diagrammatically illustrated in FIG. 10, and identified generally by reference numeral 60. A conveyor 61, on which a series of diskette receiving means 62 are disposed one after another, seriatim, travels in a horizontal plane, and is part of an endless loop (not shown) running between opposed heating means 63$f$ and 63$r$, provided with resistance heating elements $R_5$ and $R_6$ in a manner analogous to that described before.

The receiving and locating means of the apparatus accommodates an endless row of diskettes 10 positioned vertically with the label up, and held securely in mounting means 62, shown in the figure as a separate wire box clip for each diskette. Whether the diskettes are mounted singly or not is not narrowly critical, provided both front and rear portions of the diskette (for a wrap-around label) are directly exposed to the desired amount of heat. The horizontal plane in which the conveyor travels between the heating means 63$f$ and 63$r$ is chosen so that the mounting means 62 presents the diskette 10 on the conveyor at the appropriate height.

Figure 11:
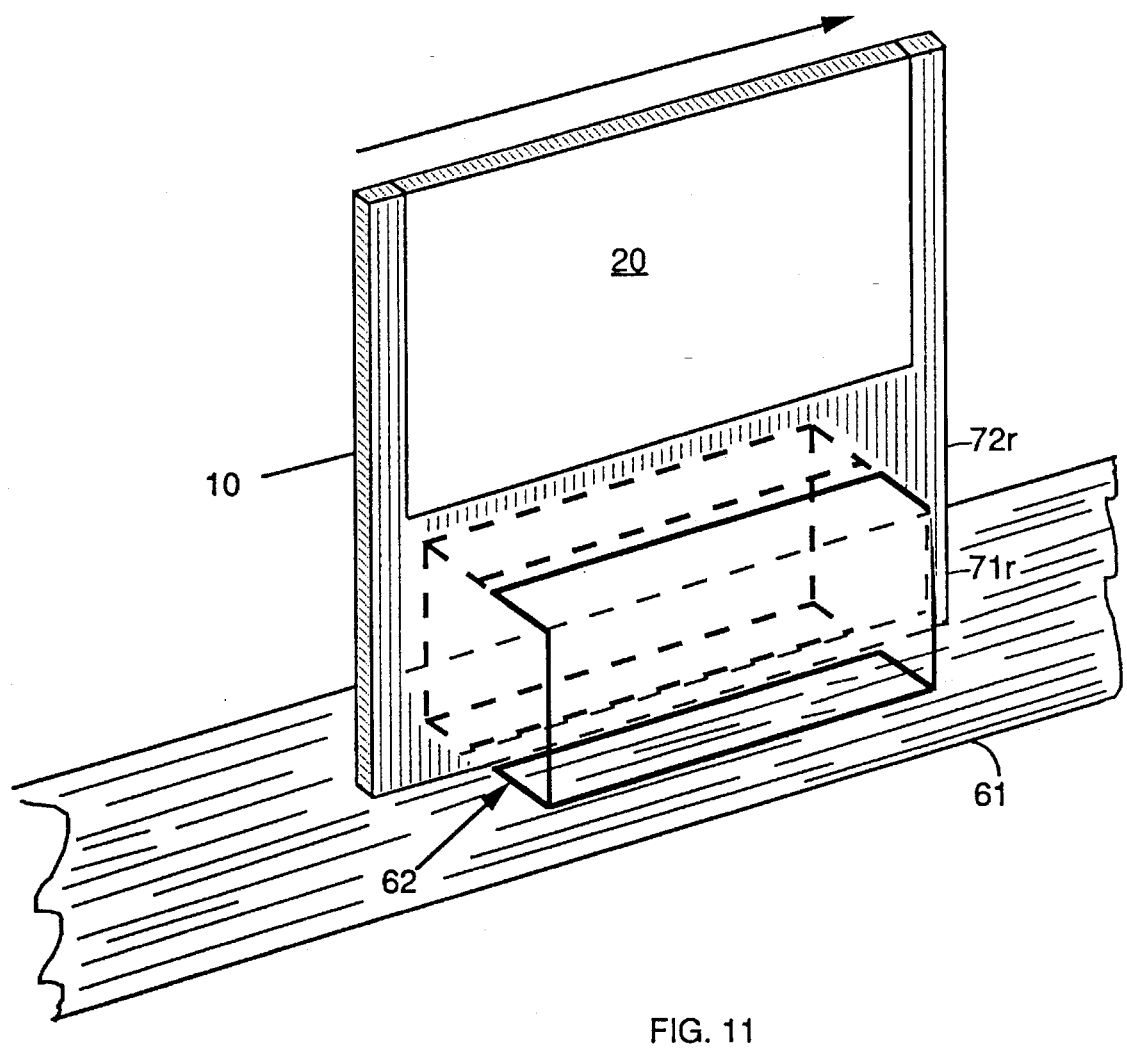
FIG. 11 is a perspective view of a wire box-clip which lightly clamps a diskette on a conveyor.

In the diagrammatic illustrations shown in FIGS. 10 and 11, each diskette 10 is held between the proximately spaced apart wire "jaws" 71$f$ and 71$r$, front and rear of the diskette respectively, of the wire box clip, indicated generally by 71 (so termed because the side elevation of each jaw symmetrically disposed relative to the central vertical plane between them, resembles the profile of the jaw of a vise). The wire jaw 71$f$ comprises a piece of wire bent into a rectangular frame, the ends of which piece are then secured to each other, as by resistance welding. One portion of the rectangle is then bent in the manner shown by the section 72$f$. A mirror image duplicate of this wire rectangle with a bent section 72$r$ is placed in mirror-image relationship to section 72$f$. The front and rear sections are then connected at their bases (the unbent portions of the rectangle) with pieces of wire 73'' and 73'' again preferably by resistance welding, so that there is a slight gap between the juxtapositioned bent sections 72f and 72r, the gap being sufficient to insert a diskette and bias the diskette between the sections 72f and 72r. The rectangular base formed by sections 73'' and 73'' joined to the bases of the bent wire rectangles, is then secured to the conveyor's upper surface 69.

As the conveyor 61 travels in its loop, and each wire clip presents itself to an operator, a just-heated diskette is removed from its clip, and a diskette to be delabeled is inserted in the wire clip, sequentially. As before, the diskettes are preferably clipped upside down, label portion up, so that the label portion of each diskette is positioned directly in front of the heating means 3f. The diskettes then enter the heating zone between the heating means 63f and 63r.

Figure 9:
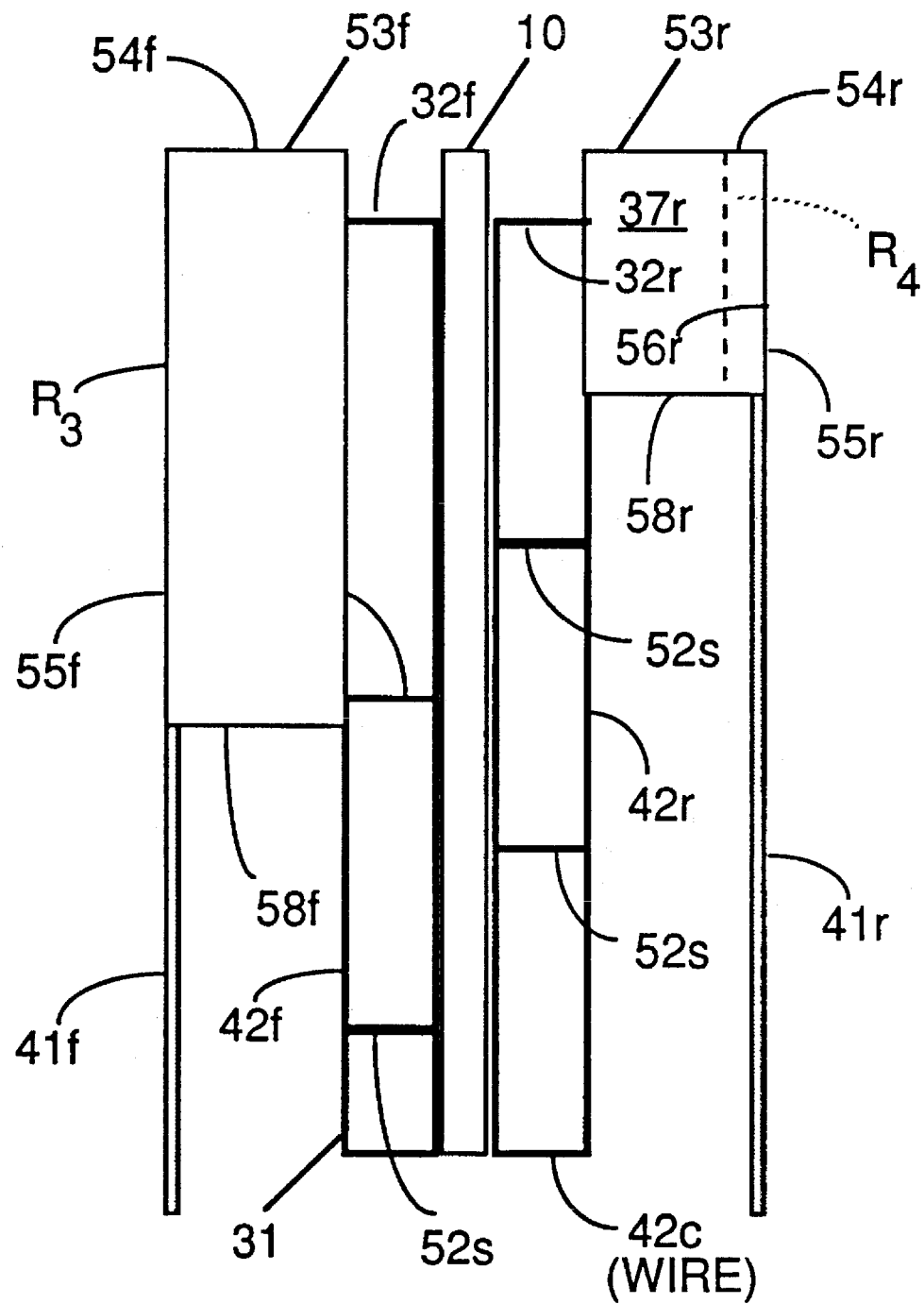
FIG. 9 is a side elevational view schematically illustrating the twin or dual "radiation de-labeler".

Each heating means comprises an elongated generally rectangular heater boxes 63f and 63r in which respective electrical resistance heating elements $R_5$ and $R_6$ are disposed, as before, on the interior wall of each of the housings. As before, the boxes 63f, 63r are transversely spaced apart banks of unequal energy-discharging area (as they were in the single diskette de-labeler shown in FIG. 6 and the twin de-labeler in FIG. 9) asymmetrically disposed relative to the diskettes 10. The boxes 63f, 63r are spaced apart a predetermined distance on parallel mounting walls 65f and 65r the distance chosen so that, at a desired conveyor speed, the diskettes spend a desired interval of time travelling between 63f and 63r. During this interval they are exposed to the appropriate amount of heat to facilitate peeling away the heated label on each diskette, most preferably when the thin layer of adhesive fails by adhesive failure.

It will be evident that the control circuit for a twin de-labeler will be substantially the same as that for the single de-labeler shown in FIG. 7. For a continuous delabeler, the control circuit is an analogous one, except that the timer element and signal means in FIG. 7 to set a desired time and signal when that time has elapsed, is replaced by a speed control for the conveyor, and current is continuously supplied to the resistance elements to maintain a desired temperature in the heating zone. The conveyor speed control determines how long the diskettes are exposed to heat energy, and the amount of energy received by each diskette per unit area of label surface.

Figure 12:
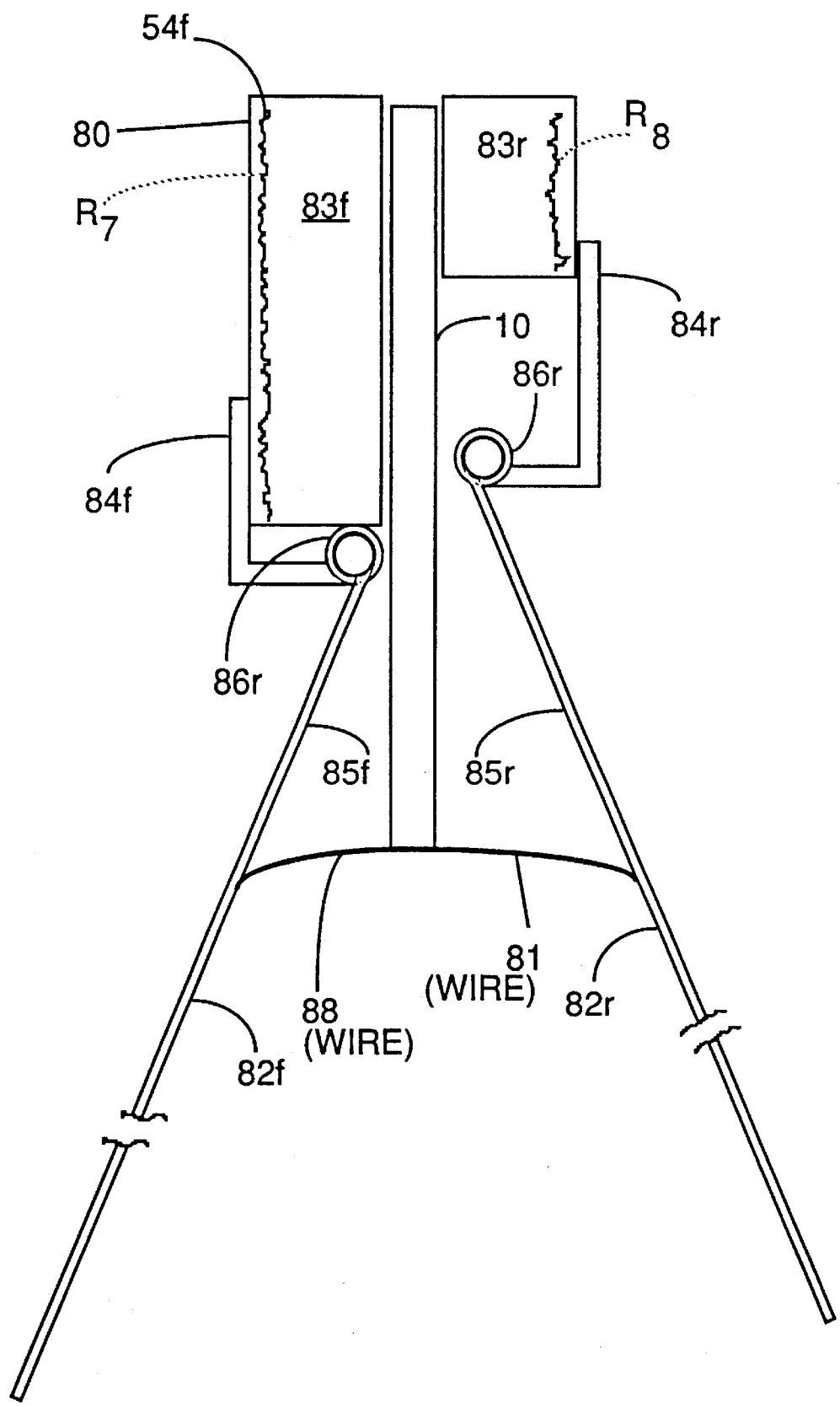
FIG. 12 is a side elevation view of a platen delabeler for a single diskette, the platens mounted along the upper edges of a manually operated spring clip. This device is referred to as a "conductive de-labeler".

Referring to FIG. 12 is a side elevation view schematically illustrating a platen de-labeler, referred to herein as a "conductive de-labeler" indicated generally by reference numeral 80, for a single diskette 10 which is clamped on edge, between opposed front and rear platens 83f and 83r which are coextensive with, and the areas of which, correspond approximately to the front and rear label portions, respectively, of the diskette. As these areas are unequal in a typical diskette, it is evident the diskette will again be heated asymmetrically about a central vertical plane through the diskette, the vertical plane being at right angles to the plane of the paper.

The platens 83f, 83r are heated with resistance heating elements $R_7$ and $R_8$ with appropriate controls analogous to those shown in FIG. 7, except that current is supplied continuously to the resistance elements to maintain each face of each platen at a substantially uniform desired temperature so that the adhesive is heated uniformly by conduction of heat from the coextensive platens over a predetermined interval of time. If only one side of the diskette is labeled, only the platen in contact with the labeled face is heated.

The diskette is appropriately located in the vertical plane by coming to rest on the base of a triangle-shaped (in side elevation) spring clip, indicated by reference numeral 81, of the type commonly used as a binding clip made from a single piece of spring steel, which clip is used to bind a stack of paper sheets. The base 88 of the triangle, which base is arcuate, supports equiangular sides 85f and 85r which terminate in cylindrical ends 86f and 86r. These ends are contiguous when there is no force applied to separate them about the vertical central axis. To separate them, such a force is applied by V-shaped levers 82f and 82r, each economically made from a single piece of wire terminating in longitudinal sections which are rotatably disposed within the cylindrical ends 86f and 86r. When the levers are pressed together with sufficient force, that is, toward the central vertical plane, using the base as the common fulcrum, the cylindrical ends 86f and 86r are separated.

Along the cylindrical ends, on the outboard sides thereof, are attached brackets 84f and 84r, the length of each being sufficient to fixedly support platens 83f and 83r. It is preferred the platens are welded to the brackets in spaced apart parallel orientation, the spacing being such that when spring tension is released, the platens are biased against the opposed label portions sufficiently to maintain even, coextensive contact between the platens and the labels. The platens 83f and 83r are maintained at a predetermined temperature in the range from 100° F.–200° F., by the resistance elements $R_7$ and $R_8$, the temperature of each platen being controlled in a manner analogous to that in which the surface temperature of a common domestic "hand iron" is controlled for ironing articles of clothing which are susceptible to damage at different temperatures.

Enough force is applied to create a gap between the cylindrical ends of the levers large enough to allow the diskette 10 to be slid through the gap until the upper edge of the diskette, inserted upside down, comes to rest on the crown of the arcuate base. In this position, the platens clamp the label portions of the diskette between them, heating the adhesive for the desired time until it reaches the desired temperature. When the signal means indicates the desired time has elapse, the diskete is removed and the label manually peeled away from it.

For greater, efficiency, if desired, a twin-conductive de-labeler for two diskettes at a time may be constructed in a manner analogous to that shown in FIG. 8 for constructing a twin radiation de-labeler, by substituting elongated platens for the platens shown in FIG. 12, and by making such adjustments for using this twin conductive delabeler configuration, as may be necessary.

Figure 13:
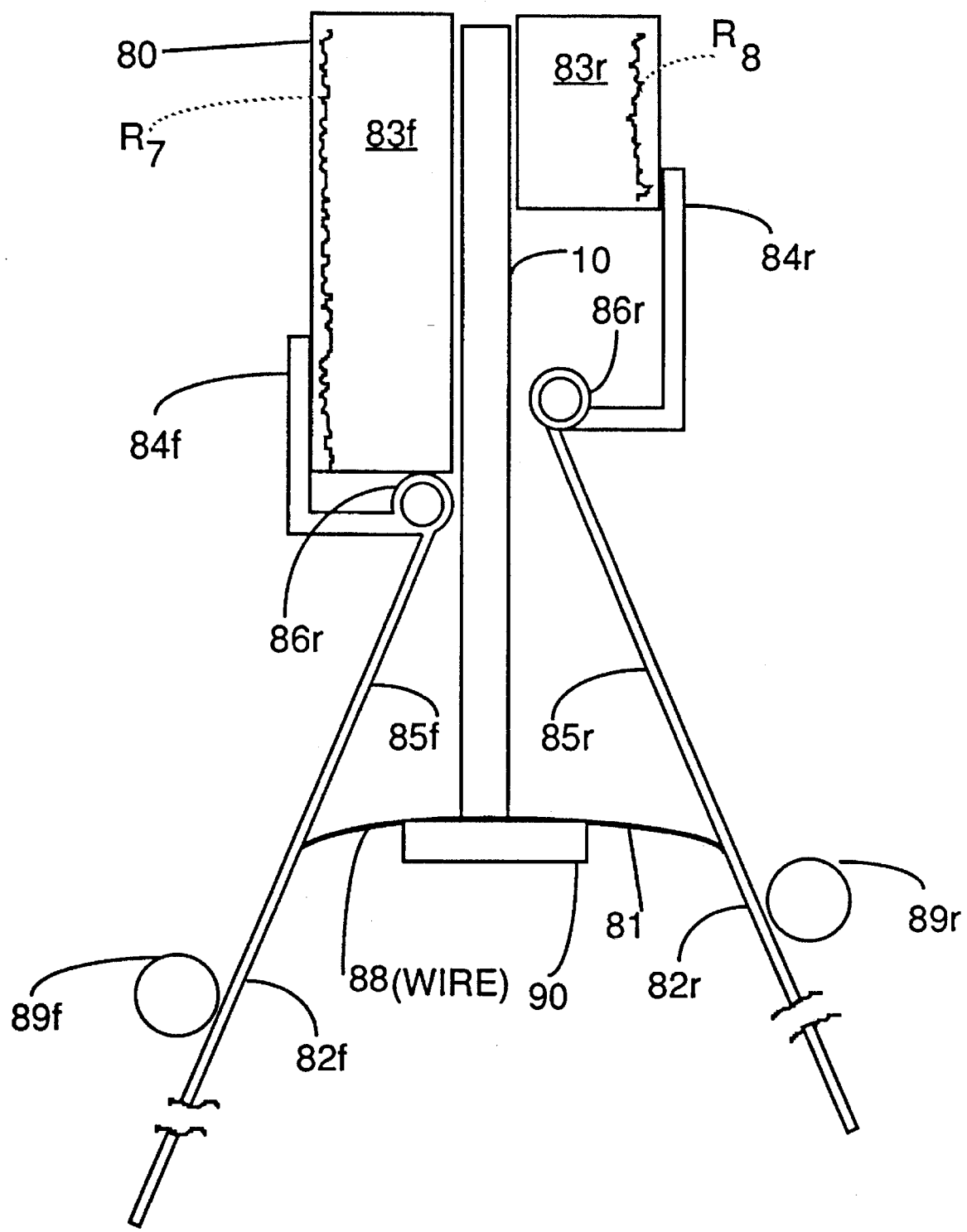
FIG. 13 is a side elevational view schematically illustrating a continuous platen de-labeler in which the platens are opened by a camming action.

For commercial use, the platen de-labeler is automated, as schematically illustrated in FIG. 13 which shows an endless loop belt conveyor 90 conveniently provided by a loop of a narrow steel strip, e.g. about 2 cm wide, to the surface of which is welded the bases 88 of a succession of triangle shaped clips 81. As each clip approaches an operator, the levers 82f and 82r come in contact with a pair of copalanar longitudinal clip guides 89f and 89r which are symmetrically positioned about the cetral vertical plane and lie horizontally directly behind and in the path of the approaching clips. The fore ends of the guides which first come in contact, substantially simultaneously, with a clip, are farther apart than the aft ends so that as the levers progress through the guides, the levers are biased inward toward the central vertical plane. The aft ends of the guides are set to proivde the desired open gap between the cylindrical ends 86f and 86r so the operator can remove a heated diskette and insert one which is to be de-labeled.

When each clip passes through the aft ends of the guides, there is no pressure exerted on the levers and they snap the platens 83f and 83r shut over the diskette's front and rear label portions respectively.

It will be appreciated that the specific adhesives which may be used by different manufacturers of diskettes will vary widely, particularly if they are PSAs. PSAs are materials which in dry form are aggressively and permanently tacky at room temperature and firmly adhere to a variety of dissimilar surfaces upon mere contact without the need of more than finger or hand pressure. Water-based emulsions and 100% solid compositions, or so-called hot melt PSAs, are favored for general use. Many paper labels are believed to have rubber-based adhesives, particularly those in which natural rubber (NR) has been supplanted by styrene-isoprene-styrene (S-I-S) block copolymers, a the dominant hydrocarbon elastomer in this category because, to a large extent, these lend themselves to hot melt formulations. Latex acrylic PSAs are also commonly used.

It will be evident to one skilled in the art that different adhesives will have different Tgs and the range of temperature over which the label can be parted in either adhesive or cohesive failure will vary, but such variation can readily be accommodated with a modicum of trial and error such as one skilled in the art is accustomed to undertake to determine optimization of time and temperature time to carry out a particular procedure. It is not necessary that the adhesive belong to the general class of PSAs, only that the adhesive undergo the necessary viscous thermal deformation during an interval, and within a delamination temperature range within which neither the casing nor the storage medium are damaged. Clearly, knowing the critical parameters for distortion of the sidewalls of any specific casing material, a manufacturer of labels for this specific purpose, namely labeling diskettes, can select an adhesive with requisite heat-sensitivity.

It will now be evident that the amount of heat energy absorbed by areas of the front and rear label portions relative to one another is not narrowly critical, if the relative sensitivity to heat of the casing and the adhesive is such that the casing is not distorted. It is critical however, that whether with predominantly direct radiation heating, or direct surface-heating, the heat transfer characteristics of the front and rear label portions of the sidewalls be such as to cause sufficient viscous thermal deformation of the thin layer of adhesive to weaken the adhesive bond between the label and the surface to which the label is adhered. As long as the heated adhesive remains adequately fluid for enough time, one may manually peel away the label. To do so, one generally requires at least about 1 sec, and preferably from 5 sec to 15 sec, referred to as the "peeling window", which is the result of combining two other inter-dependent windows, namely the "temperature window" and the "time window". The time window specifies the interval of time during which the desired amount of viscous deformation is maintained in the temperature range specified by the temperature window, and vice versa. Upon reaching a temperature in the peeling window within a desired time in the time window, the diskette is removed from the heating zone and the label removed within from 1–10, typically no more than 5 sec thereafter.

Since only about 20% of the rear surface of a diskette is heated in a de-labeler in an asymmetric heating zone which is asymmetric about two orthogonal planes, in general, the front label portion of the casing absorbs at least twice as many units of energy as does the rear portion. Further, the front label portion which is less than 75% of the overall area of the front sidewall, absorbs at least twice as much energy as does the unlabeled front portion of the casing. Because the thermal conductivity of a sidewall is in the same range as a thermally insulating synthetic resin, the material of choice for diskettes, and the foam pads behind each sidewall serve to thermally insulate the storage medium, the front label portion is more prone to distortion during heating than the rear. The only special precaution need to be taken is to avoid overheating the casing to enter the desirable peeling window. This peeling window is usually established if the diskette is removed from the heating zone when the difference between the exterior and interior temperatures at locations directly opposite each other, on a sidewall directly exposed to heat energy, is in the range from about 15° F. to about 45° F.

It will now be evident that it is not preferred to obtain the maximum temperature difference between the exterior and interior locations on a sidewall, if adhesive failure is sought. The preferred temperature difference is large enough when it provides the shortest time practical in the peeling window, during which time the delaminating temperature range is for adhesive failure. Such conditions of temperature and time are facilitated when the diskette is positioned upside down as shown in the Figures because the upper portion of the diskette (placed down) is not heated, but exposed to the atmosphere, thus providing a heat sink.

Having thus provided a general discussion, described the overall process in detail and illustrated specific embodiments of devices of the best mode of carrying out the process, it will be evident that this invention is based on minimizing the risk of heating a diskette sufficiently to remove the label without damaging either the casing or the storage medium therewithin. The risk is minimized when one heats the diskette under the constraints of the peeling window. It will be equally evident that one may heat the entire diskette under the constraints of the peeling window, but not only the risk but also the cost is minimized when only the label portions are directly heated so as to enter that window. Such a simple but effective solution to a highly topical problem, not only avoids waste by reusing diskettes, but it also saves the costs of disposing of the diskettes.

It is therefore to be understood that no undue restrictions are to be imposed by reason of the specific embodiments illustrated and discussed, and particularly, that the invention is not restricted to a slavish adherence to the details set forth herein.

We claim:

1. A device for heating a label of laminar imprintable material, prior to removal thereof from a surface of a standard diskette to which said label is non-removably adhered with a thin layer of adhesive, said diskette having front and rear generally laminar sidewalls which define a casing, in which is non-removably captured a storage disk protected by opposed planar foam pads within said casing; a front label portion extending over at least about 60% of said front sidewall; a rear label portion extending over about 15% of said rear sidewall; said label being adhesively secured to at least said front label portion, said device comprising, (a) support means to receive and support a diskette in a desired position;

(b) opposed first and second heating means mounted in desired spaced-apart relationship with each other and a diskette therebetween supported in a vertical plane delimited by a pair of opposed biasing means adapted to maintain surfaces of the diskette which are not heated, open to the atmosphere, at least said first heating means providing direct heat energy in a heating zone over said front label portion, said first and second heating means are adapted to direct heat energy over substantially only an area coextensive with the front and rear label portions, respectively, together providing sufficient heat energy to heat said adhesive to a temperature within a range in which said adhesive undergoes thermal viscous deformation; and, (c) control means including (i) a timer element to provide a predetermined duration of current of requisite amperage and continuous voltage to at least said first heating means, (ii) a starting switch means, and (iii) a signal means recognizable by human senses, said control means being connected to at least said first heating means.

2. The device of claim 1 wherein said control means includes a (iv) temperature sensing means coacting with said switch means to provide a desired temperature in said heating zone.

3. The device of claim 2 wherein said control means includes a (v) a selector circuit for selecting only said first heating means; and, said control means is connected to a source of current to provide current of requisite amperage and continuous voltage to said first heating means only, or to both said first and second heating means.

4. The device of claim 1 wherein said support means includes a receiving and locating means for said diskette which is delimited by biasing means.

5. The device of claim 4 wherein said first and second heating means are electrical resistance heating elements and said heat energy is transferred to said front and rear label portions predominantly by radiation.

6. The device of claim 4 wherein said first and second heating means are coextensively disposed over the width of about two diskettes juxtapositioned laterally in side-by-side relationship.

7. The device of claim 1 wherein said first and second heating means are electrical resistance heating elements and said heat energy is transferred to said front and rear label portions predominantly by conduction.

8. An apparatus for sequentially heating labels of laminar imprintable material, prior to removal thereof from surfaces of plural standard diskettes to each of which said label is non-removably adhered with a thin layer of adhesive, each diskette having front and rear laminar sidewalls which define a casing in which is non-removably captured a storage disk protected by opposed planar foam pads within said casing; a front label portion extending over about 60% of said front sidewall; a rear label portion extending over about 15% of said rear sidewall; said label being adhesively secured to at least said front label portion, said device comprising, (a) an endless conveyor means defining a loop;

(b) support means integral with said conveyor means, said support means defining a desired position of said diskette;

(c) opposed first and second heating means mounted in desired proximately spaced-apart relationship with each other and said diskette therebetween, at least said first heating means being provided with current of requisite amperage and continuous voltage to maintain a desired temperature within said heating zone, and to provide heat energy directed above and directly across a desired length of said conveyor, so as to sequentially heat said front label portions of diskettes, said first and second heating means together providing sufficient heat energy to heat said adhesive to a temperature within a range in which said adhesive undergoes thermal viscous deformation; and, (d) control means including (i) a speed control element to provide a predetermined speed at which said conveyor travels between said first and second heating means so as to expose said casing, within a desired interval of time from 1 to 30 sec, to sufficient heat energy to heat said adhesive to a temperature within a range in which said adhesive undergoes thermal viscous deformation; (ii) a starting switch means, and (ii) temperature sensing means coacting with said switch means to provide a desired temperature in said heating zone.

9. The apparatus of claim 8 wherein said diskette is supported on said conveyor means in a vertical plane delimited by a pair of opposed biasing means;

said first and second heating means direct heat energy over substantially only an area coextensive with said front and rear label portions, respectively;

said heating means are electrical resistance heating elements from which said heat energy is transferred to said front and rear label portions predominantly by radiation; and, said control means includes a (v) a selector circuit for selecting only said first heating means.

10. The apparatus of claim 8 wherein said diskette is supported on said conveyor means in a vertical plane delimited by a pair of opposed biasing means;

said first and second heating means direct heat energy over substantially only an area coextensive with said front and rear label portions, respectively;

said heating means are electrical resistance heating elements from which said heat energy is transferred to said front and rear label portions predominantly by conduction; and, said control means includes a (v) a selector circuit for selecting only said first heating means.

* * * * *

UNITED STATES PATENT AND TRADEMARK OFFICE
CERTIFICATE OF CORRECTION

PATENT NO.  : 5,587,096
DATED       : December 24, 1996
INVENTOR(S) : Gary S. Huvard, et al It is certified that error appears in the above-indentified patent and that said Letters Patent is hereby corrected as shown below:

On the title page item [54], should read

DE-LABELLING APPARATUS FOR REMOVING A LABEL ADHERED TO A DISKETTE UTILIZING OPPOSED HEATERS

Signed and Sealed this

Twenty-second Day of July, 1997

*Attest:*

BRUCE LEHMAN

*Attesting Officer*     *Commissioner of Patents and Trademarks*